United States Patent [19]
Bernard et al.

[11] 3,866,288
[45] Feb. 18, 1975

[54] ELECTROPLATED ISOTACTIC POLYPROPYLENE

[76] Inventors: Jean Claude Bernard, Le Meyran; Pierre J. Pascal, rue Gerard Philippe, both of Martigues 13, France

[22] Filed: Feb. 20, 1973

[21] Appl. No.: 334,003

Related U.S. Application Data

[63] Continuation of Ser. No. 49,965, June 25, 1970, abandoned.

[30] Foreign Application Priority Data
July 1, 1969 France .............................. 69.22101

[52] U.S. Cl. ................... 29/195, 29/199, 117/47 R, 117/138.8 E, 204/30
[51] Int. Cl. ........................... B23p 3/20, C23b 5/64
[58] Field of Search ...... 204/30; 117/43.7 R, 130 E, 117/138.8 E; 260/876 RB, 878 RB; 29/195, 199

[56] References Cited
UNITED STATES PATENTS

| | | | |
|---|---|---|---|
| 3,556,955 | 1/1971 | Ancker | 204/30 |
| 3,620,804 | 11/1971 | Bauer et al. | 117/47 A |

*Primary Examiner*—R. L. Andrews

[57] ABSTRACT

This invention is addressed to the electroplating of plastic compositions containing isotactic polypropylene wherein articles formed of a polymeric composition selected from the group consisting of a mixture of from 75 to 97% by weight isotactic polypropylene and 3 to 25% of an olefin copolymer having low crystallinity and a graft copolymer formed of 75 to 97% by weight of isotactic polypropylene onto which is grafted 3 to 25% by weight of a copolymer of ethylene and propylene containing more than 10% by weight ethylene are electroplated to form a thin coat of a metal on at least one surface thereof.

6 Claims, No Drawings

ELECTROPLATED ISOTACTIC POLYPROPYLENE

This is a continuation, of application Ser. No. 49,965, filed June 25, 1970 and now abandoned.

This invention relates to the electroplating of plastic materials formed of isotatic polypropylene.

It is known that isotactic polypropylene has a number of properties, such as thermal stability and resistance to mechanical, chemical and atmospheric agents, which render it attractive for use in the manufacture of articles which are molded, shaped or extruded. In certain of these applications, particularly in the manufacture of accessories for road vehicles, of aeronautical accessories and of appliances for household use, it is frequently desirably to provide such articles with a coating of a metal, such as nickel, chromium or gold. The coating should be adherent to the isotactic polypropylene and at the same time be continuous, at least as to the parts which are visible. In addition, it must have a pleasing appearance.

For other plastic materials, such as resins of the A.B.S. (acrylonitrile, butadiene, styrene) type, metalization treatments which are capable of providing metal coatings of the type described are known. It is therefore desirable to provide a composition formed substantially of isotactic polypropylene which is capable of being metalized by such known treatment methods.

It has been proposed to treat compositions having a polypropylene base which contain charges such as glass fibers or asbestos fibers to provide metal coatings on articles formed therefrom. However, in order to obtain a satisfactory metal coating, it has proved necessary in practice to employ large quantities of the charges, as much as 60% by weight based upon the weight of the polypropylene. The use of such large quantities of charged materials gives rise to considerable difficulties in forming the composition as well as during transformation of the composition into the desired shape by, for example, molding or extrusion.

It is accordingly an object of the present invention to provide a new and improved isotactic polypropylene composition which is capable of being electroplated.

It is a related object of the invention to produce and to provide a method for producing an article formed of isotactic polypropylene having a metal coating on the surface thereof.

The concepts of the present invention reside in a new and improved composition comprising either a mixture of from 75 to 97% by weight isotactic polypropylene and 3 to 25% by weight of an olefin copolymer having low crystallinity, such as copolymer of ethylene and propylene containing more than 10% by weight ethylene or a copolymer of isobutene with isoprene and/or butadiene in which the isobutene content is greater than 90% by weight; or a graft polymer of 75 to 97% isotactic polypropylene onto which is grafted from 3–25% by weight of a mixture of ethylene and propylene containing more than 10% by weight ethylene. It has been found that articles formed of one of the foregoing compositions can be electroplated to provide an adherent metal coating on the surface thereof.

Mixtures of the isotactic polypropylene and one of the copolymers having low crystallinity described above can be prepared in accordance with any of a variety of known techniques. It is frequently preferred to mix the components of the mixture in powder form, and passing them through a mixer at a temperature in excess of the softening points of each of the constituents.

The graft polymers described above can be prepared by carrying out the polymerization reaction in two or more successive sequences in which propylene is first polymerized alone, and then a mixture of ethylene and propylene is polymerized in the presence of the product of the first stage of the sequence. The polymerization reaction is carried out in the presence of the well known Ziegler catalyst.

By way of modification, it has been found that the adherence of the coating and the regularity and appearance of the metallic deposits on an article formed on one of the foregoing compositions can be significantly improved by incorporating into the polymeric material an amount up to 2% by weight, and preferably 0.1 to 0.5% by weight, of at least one organic derivative of nitrogen. Suitable organic nitrogen derivatives include amines or amides containing at least one aliphatic chain of at least 6 carbon atoms and at least one oxygen atom in the form of a hydroxy, an alkoxy or an acyl group.

Preferred organic nitrogen derivatives are those having the general formula:

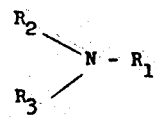

wherein $R_1$ is hydrogen or alkyl containing at least 6 carbon atoms, and preferably 6 to 20 carbon atoms such as hexyl, octyl, decyl, dodecyl, tetradecyl, octadecyl, etc.; $R_2$ is hydrogen, alkyl containing at least 6 carbon atoms, and preferably 6 to 20 carbon atoms, such as the alkyl groups described above, hydroxy alkyl groups having the formula:

$$HO - C_nH_{2n} -$$

wherein $n$ is an integer of at least 2, and preferably 2 to 12, as represented by 2-hydroxy ethyl, 3-hydroxyl propyl, 4-hydroxy butyl, 6-hydroxy hexyl, etc., an amide group having the formula:

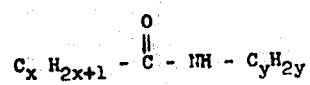

wherein $x$ and $y$ are integers of at least 5, and preferably 5 to 20, as represented by the amide group derived from N-pentyl hexanamide, N-pentyl pentanamide, N-hexyl octanamide, N-octyl decanamide, N-octyl laurylamide, N-dodecyl stearyl amide, etc., and, or a hydroxy ether group having the formula:

$$C_aH_{2a+1} - O - (C_bH_{2b-2} - OH) - CH_2 -$$

wherein $a$ is an integer of at least 6, and preferably 6 to 20 and $b$ is an integer from 2 to 3, such as 3-hexyloxy-2-hydroxypropyl, 3-octyloxy-2-hydroxypropyl, 3-decyloxy-2-hydroxypropyl, 4-octyloxy-3-hydroxybutyl, 4-dodecyloxy-3-hydroxybutyl, etc; and, $R_3$ is a hydroxyl alkyl having the formula:

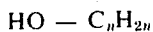

wherein $n$ has the values set forth above, or an acyl group having the formula:

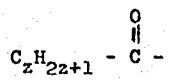

wherein $z$ is an integer of at least 5, and preferably 5 to 20 carbon atoms. Representative acyl groups include hexanoyl, octanoyl, decanoyl, dodecanoyl, etc.

The most preferred of the above nitrogen derivatives used in accordance with the practice of the present invention include tertiary amines of the formula:

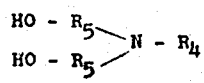

wherein $R_4$ is alkyl containing 12 to 16 carbon atoms (e.g. dodecyl, tridecyl, tetradecyl, etc.), $R_5$ are each alkylene containing 2 to 6 carbon atoms (e.g. ethylene, trimethylene, tetramethylene, hexamethylene, etc.). Representative of the foregoing are N,N-bis-(2-hydroxyethyl) dodecyl amine, N,N-bis-(3-hydroxypropyl) dodecylamine, N-(2-hydroxyethyl)-N-(3-hydroxypropyl) dodecyl amine, N,N-bis-(2-hydroxyethyl) tetradecylamine and a variety of others.

Also included in the preferred nitrogen derivatives are secondary amines of the general formula:

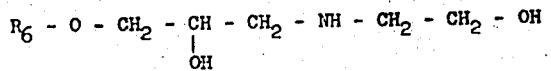

wherein $R_6$ is alkyl containing 8 to 19 carbon atoms, such as octyl, decyl, dodecyl, tetradecyl, etc. Representative compounds falling within the above general formula include N-(3-dodecyloxy-2-hydroxypropyl) ethanolamine, N-(3-octyloxy-2-hydroxypropyl) ethanolamine, etc.

Also included in the preferred organic nitrogen derivatives are amides of the formula:

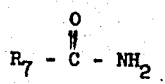

wherein $R_7$ is alkyl containing 5 to 17 carbon atoms. Representative amides include hexanamide, octanamide, laurylamide, stearyl amide, etc.

Also included are diamides of the general formula:

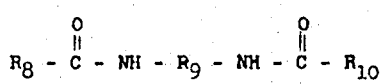

wherein $R_8$ and $R_{10}$ are each alkyl containing 5 to 17 carbon atoms, such as hexyl, octyl, decyl, dodecyl, tetradecyl, etc., and $R_9$ is methylene or ethylene. Illustrative of the foregoing amides are methylene dilaurylamide, ethylene di-lauryl amide, methylene dipalmityl amide, ethylene di-stearyl amide, methylene di-stearyl amide, etc.

The foregoing organic nitrogen derivatives can be incorporated into the polymeric or plastic material by a number of well-known techniques. For example, the components can be mixed, and then passed through a mixing device, such as a mixer of the cylinder type or a screw type, at a temperature in excess of the softening points to insure uniform distribution of the nitrogen compound throughout the polymeric material.

If desired, a variety of the usual polypropylene additives, such as stabilizers, neutralizers, colorants and/or mineral charges, can be added to the plastic materials.

The plastic or polymer compositions of the invention can be formed into articles for electroplating by, for example, injection molding techniques or compression. The resulting articles can then be subjected to treatment for metallization by electroplating in accordance with a technique more fully described hereinafter. Metallic deposits thereby formed on articles of the compositions of the invention exhibit good adherence to thin support, frequently superior to the adherence realized with the use of A.B.S. polymer systems described above.

The metallization treatment is preferably carried out by means of the electroplating techniques used for A.B.S. type resins, which include, by way of example, the following operations:

1. degreasing;
2. attack by a phospho-sulphochromic mixture;
3. sensitizing by means of stannous chloride;
4. activation by means of palladium chloride;
5. chemical nickel-plating;
6. electro-chemical nickel-plating;
7. electrolytic copper-plating;
8. finishing by electrolytic depositing of nickel and/or of chromium, or of nickel and/or of gold.

The coating of the metallized pieces which are on a base of plastic materials, according to the invention, shows a good adherence on the supports. Its continuity and its surface appearance are very good particularly when the articles are formed of a plastic composition containing the organic derivatives of nitrogen described above. The articles thus metallized may be used in numerous fields, particularly in the manufacture of road vehicle accessories and aeronautical accessories, and also in the manufacture of appliances for domestic use.

Having described the basic concepts of the invention, reference is now made to the following examples which are provided by way of illustration, and not by way of limitation, of the practice of the invention.

EXAMPLE 1

(Test No. 1)

A graft copolymer based on isotactic polypropylene is prepared by sequence polymerization in the presence of a Ziegler type catalyst. In carrying out the sequence polymerization, propylene is first polymerized alone to form isotactic polypropylene, onto which is grafted a copolymer of ethylene and propylene, with the ethylene constituting 80% by weight of the ethylene propylene mixture.

The graft copolymer is thereafter separated from the reaction mixture, and is found to contain 10% by weight of the ethylene-propylene copolymer grafted to the isotactic polypropylene, based upon the total weight of the graft copolymer.

The copolymer obtained is stabilized by 0.25% by weight of dilaurylthiodipropionate and 0.25% by weight of the octadecylic ester of β(3′,5′) ditertiary butyl-4′ hydroxyphenyl) propionic acid.

Without the addition of other adjuvants into the composition, the latter is transformed into sheets, by molding at 230°C under a pressure of 130 bars. Then, from these sheets, parallelopiped-shaped test pieces are cut, 25 × 125 × 4 mm in size.

These test pieces are subjected to the metallization treatment of the following operations:
1. Degreasing with a soda lye;
2. Rinsing with cold water;
3. Neutralization with an aqueous solution of bisulphite of soda;
4. Rinsing with cold water;
5. Attack for 20 minutes at 80°C. with a phospho-sulpho-chromic mixture consisting of:

| | |
|---|---|
| a.) sulphuric acid(98%) | 53% by wt. |
| b.) phosphoric acid(85%) | 22% by wt. |
| c.) chromic acid asCrO$_3$ | 2% by wt. |
| d.) distilled water | 23% by wt. |

6. Rinsing with cold water;
7. Sensitizing with a solution of stannous chloride of the following composition for 30 seconds to 20°C.

| | |
|---|---|
| a.) SnCl$_2$ | 5–10 g. |
| b.) HCl | 40 ml. |
| c.) H$_2$O | 1000 ml. |

8. Rinsing with cold water;
9. Activation in a solution of palladium chloride obtained by adding to 1 litre of water 2.5 ml of an aqueous solution of 2% by weight PdCl$_2$ and 1 ml HCl for 30 seconds at 40°C.;
10. Rinsing in cold water;
11. Formation of a nickel-conducting layer by chemical reduction by means of the following solution for 5 to 10 minutes at 60°C.:

| | |
|---|---|
| a.) chloride of nickel | 25 g. |
| b.) hypophosphite of sodium | 10 g. |
| c.) sodium citrate | 100 g. |
| d.) ammonium chloride | 50 g. |
| e.) water | added to make 1 litre |

12. Rinsing with cold water;
13. Electrolytic nickel-plating in overpoled manner in a bath having the following composition:

| | |
|---|---|
| a.) nickel sulphate | 150 g. |
| b.) nickel chloride | 150 g. |
| c.) boric acid | 50 g. |
| d.) water | added to make 1 litre. |

The electrolysis is carried out at ambient temperature with a current density of 2 amperes/dm$^2$ for 5 minutes.

14. Rinsing with cold water.
15. Electrolytic copper-plating in a concentrated bath of:

| | |
|---|---|
| a.) copper sulphate | 225 g. |
| b.) sulphuric acid to 98 % | 45 g. |
| c.) water | added to make 1 litre. |

The bath may contain brightening agents, if desired.

The electrolysis is carried out at ambient temperature with a current density of 6 amperes/dm$^2$ for a period of two and one-half hours. The thickness of the deposit is measured. Normally it is less than 15 microns for A.B.S. type resins. This electrolytic deposit of copper is followed by an electrolytic finishing-deposit of nickel.

After metallization, the adherence of the metallic film is measured by means of a dynamometer in accordance with the technique described in the article "The Adhesion of Electrodeposits to Plastics," Plating, Oct. 1965, p. 982.

The results of this measuring and a description of the appearance of the test piece are given in Table I.

In Table I there are likewise shown, under the heading "Test No. 0," the results of metallization tests effected under the same conditions as described above on a test piece made of isotactic polypropylene stabilized in the same manner as the sample in Test No. 1.

A comparison of the results of the Tests 0 and 1 reveals that the adherence of the metallic deposit on the test piece No. 1 is substantially increased relative to the test piece No. 0, and that the appearance is clearly more satisfactory.

EXAMPLE 2

(Test No. 2)

The operation is effected in the same manner as described in Test No. 1, except that the graft copolymer is formed with a graft of 20% by weight of the copolymer propylene-ethylene based upon the total weight of the polymer.

In Table I (Test No. 2) it can be seen that, in relation to Test No. 1, the adherence is even further increased, but that the appearance remains substantially unchanged.

EXAMPLES 3 and 4

(Test Nos. 3 and 4)

Into the graft copolymer prepared in Test No. 1, there is incorporated, in addition to the stabilizers used in Test No. 1, 0.5 % by weight of N-(3-dodecyloxy-2-hydroxypropyl) ethanolamine (Test No. 3) or 0.5% by weight of N-N,bis(2-hydroxyethyl) alkyl (C$_{12}$–C$_{18}$) amine (Test No. 4).

Then the metallization treatment is carried out in the manner described in Example 1. In Table I (Test Nos. 3 and 4), it can be seen that the behavior in the metallization of the copolymer of Test No. 1, treated by the above-mentioned amines, is considerably improved, not only with respect to the adherence but also with respect to the appearance of the coating.

By way of comparison, there is shown in Table I, under the heading "Test No. 00," the results of a metallization treatment carried out on homopolymeric polypropylene which has been mixed with the preceding stabilizers and 0.5% by weight of N-(3-dodecyloxy-2-hydroxypropyl) ethanolamine, as in Test No. 3. In comparison to the reference homopolymeric polypropylene (Test No. 0) it can be seen that the adherence is scarcely improved and that the appearance is not satisfactory.

4. An article as defined in claim 1 wherein said polymeric material is the mixture and the olefin copolymer having low crystallinity is selected from the group consisting of copolymers of ethylene and propylene containing more than 10% by weight ethylene and a copolymer of isobutene and a diolefin selected from the group consisting of isoprene, butadiene and mixtures thereof in which the isobutene content is greater than 90% by weight.

5. An article as defined in claim 1 wherein the polymeric material also includes an additive selected from the group consisting of stabilizers, colorants, mineral charges and mixtures thereof.

6. An article as defined in claim 1 wherein the polymeric material also includes at least one compound selected from the group consisting of tertiary amines of the formula:

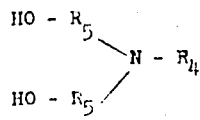

wherein $R_4$ is alkyl containing 12-16 carbon atoms and each $R_5$ is alkylene containing 2-6 carbon atoms, secondary amines of the formula:

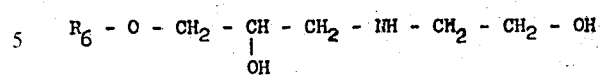

wherein $R_6$ is alkyl containing 8-19 carbon atoms, amides of the formula:

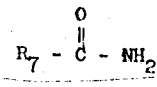

wherein $R_7$ is alkyl containing 5-17 carbon atoms and diamides of the formula:

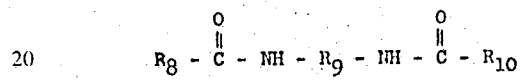

wherein $R_8$ and $R_{10}$ are each alkyl containing 5-17 carbon atoms and $R_9$ is methylene orethylene.

* * * * *